DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 3, 1974

926 O.G. 10

T926,004

MASTIC OF INORGANIC INSULATING CEMENT POLY(m - PHENYLENE ISOPHTHALAMIDE) FIBERS, AND WATER

Thomas Edward Pavey, 3619 Harris Ave., Richmond, Va. 23223

Filed Aug. 14, 1973, Ser. No. 388,136

Int. Cl. C08g *51/04, 51/24*

U.S. Cl. 260—29.2N

No Drawing. 6 Pages Specification

A reinforced mastic for sealing cracks in insulation, especially in insulation for heated piping. The mastic comprises water, a quick-drying insulating cement, and reinforcing fibers of poly (m-phenylene isophthalamide). The mastic has excellent resistance to thermal degradation from high temperatures and incurs little cracking. The fibers are preferably short-length cut fibers, while the cement is usually an inorganic silicate-containing material. The cement and the fibers are dry-mixed (up to about 2% fibers can be used based on weight of cement) and then water added. The resulting mastic can then be applied in the same manner as nonreinforced insulating "mud."